United States Patent [19]
Hoshino

[11] Patent Number: 5,463,513
[45] Date of Patent: Oct. 31, 1995

[54] MAGNETIC HEAD ASSEMBLY FOR A MAGNETIC DISK DRIVE

[75] Inventor: Yoshimasa Hoshino, Ohta, Japan

[73] Assignee: NEC Corporation, Tokyo, Japan

[21] Appl. No.: 311,711

[22] Filed: Sep. 23, 1994

Related U.S. Application Data

[63] Continuation of Ser. No. 907,282, Jul. 1, 1992, abandoned.

[30] Foreign Application Priority Data

Jul. 1, 1991 [JP] Japan .................................... 3-159326

[51] Int. Cl.⁶ ...................................... G11B 5/48
[52] U.S. Cl. ............................................. 360/104
[58] Field of Search .......................... 360/104, 11

[56] References Cited

U.S. PATENT DOCUMENTS

| 4,343,025 | 8/1982 | Kranfeld | 360/104 |
| 4,379,316 | 4/1983 | Krane | 360/104 X |
| 4,520,555 | 6/1985 | Gyi | 360/104 X |
| 4,625,249 | 11/1986 | Iwata | 360/104 |
| 4,823,217 | 4/1989 | Koto | 360/104 |

Primary Examiner—A. J. Heinz
Attorney, Agent, or Firm—Sughrue, Mion, Zinn, Macpeak & Seas

[57] ABSTRACT

A magnetic head assembly incorporated in a magnetic disk drive for recording and reproducing data from a magnetic recording medium. A magnetic head is mounted on the free end of a suspension arm by a gimbal spring and a flexible printed circuit. A lug or lugs extend out from the flexible printed circuit for controlling the angular movement and, therefore, the resonance of the gimbal spring.

12 Claims, 9 Drawing Sheets

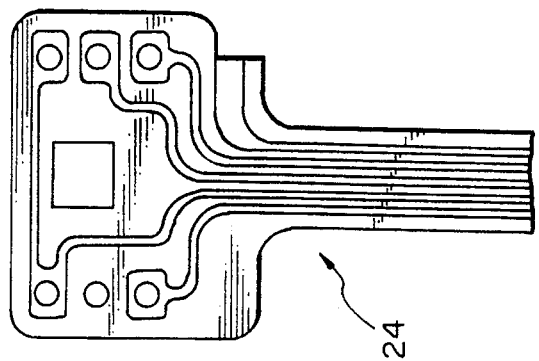
Fig. 3 PRIOR ART
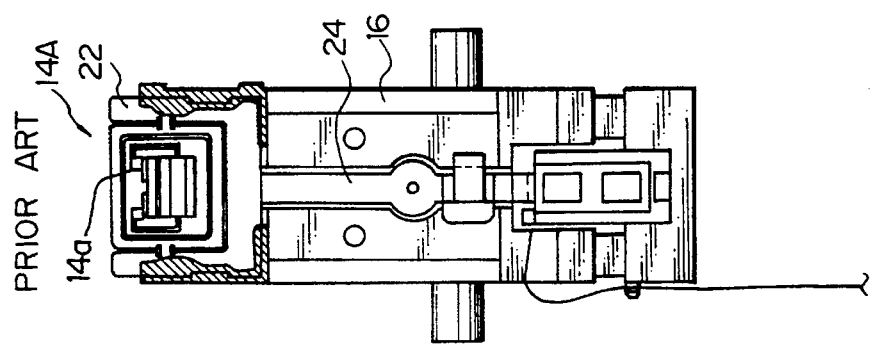
Fig. 2C PRIOR ART
Fig. 2B PRIOR ART
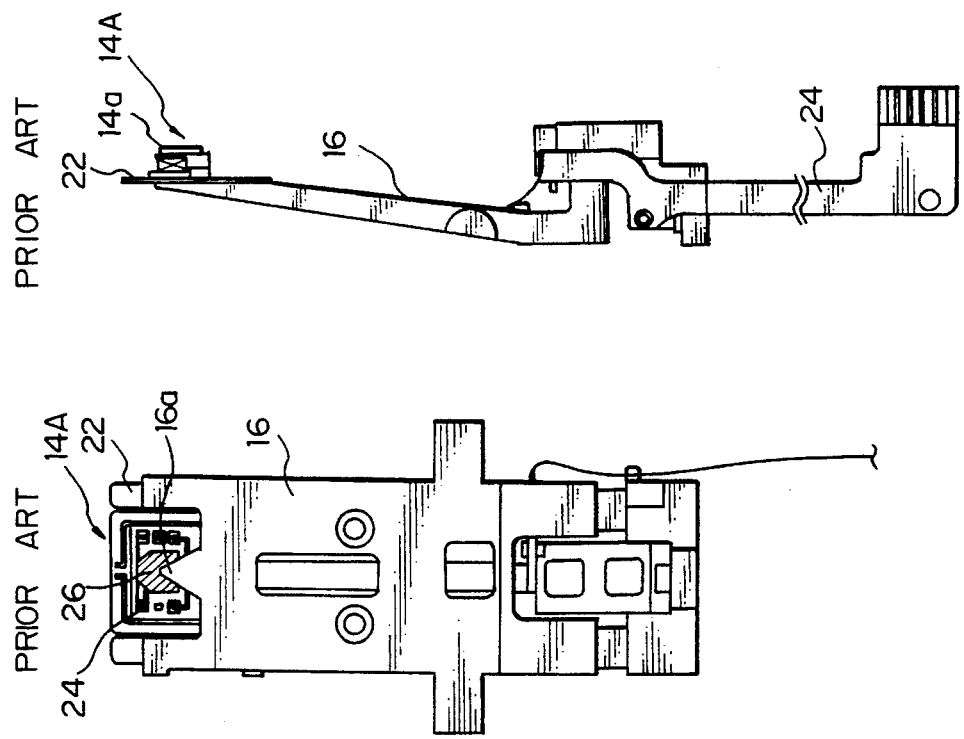
Fig. 2A PRIOR ART

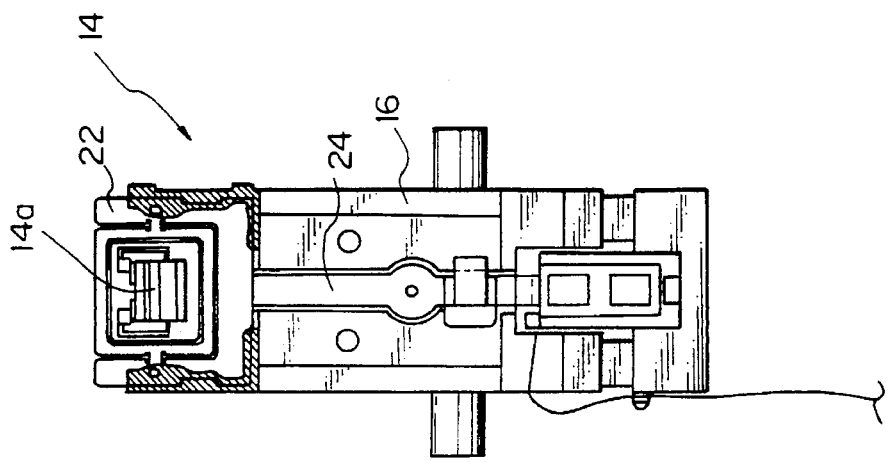
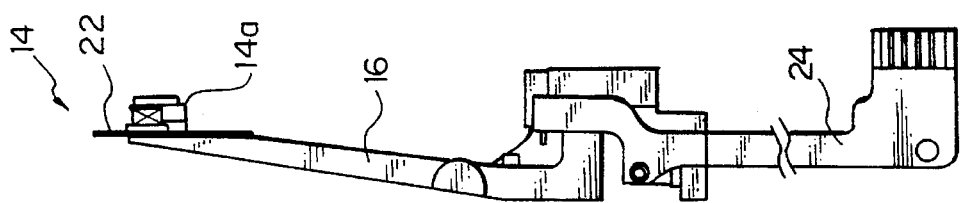
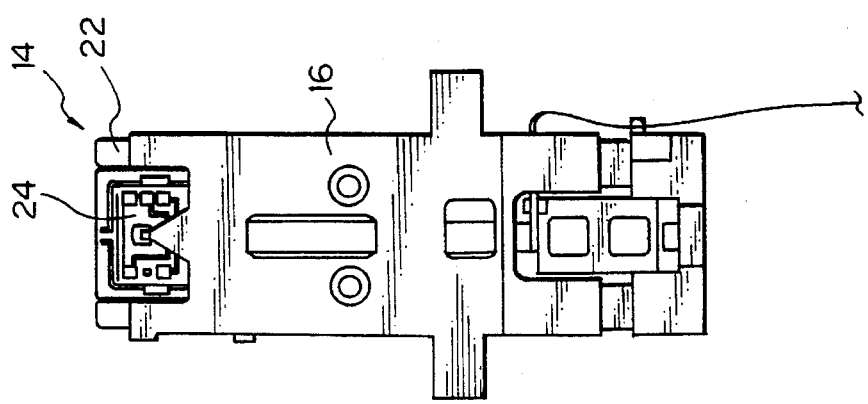

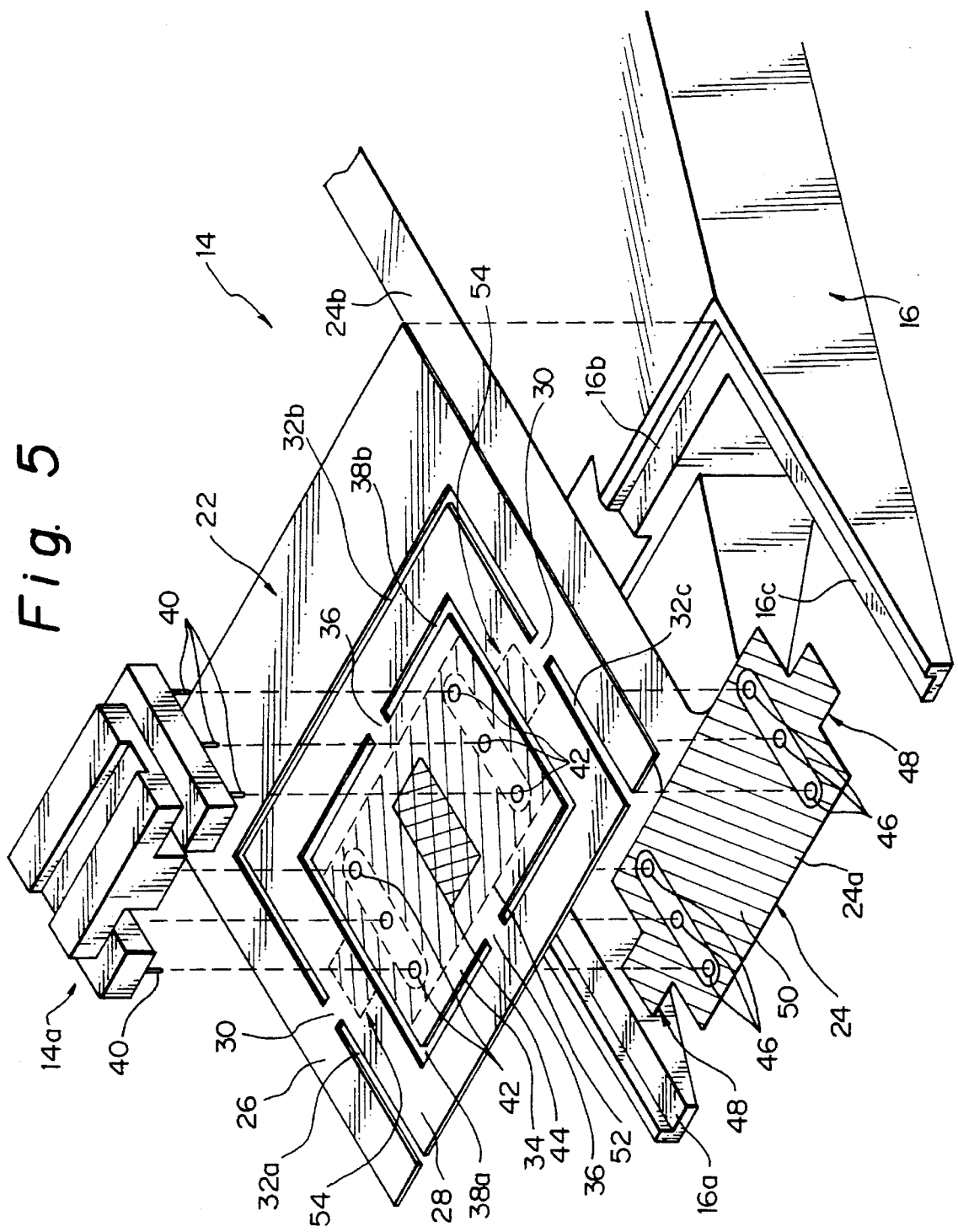

5,463,513

MAGNETIC HEAD ASSEMBLY FOR A MAGNETIC DISK DRIVE

This is a continuation of application No. 07/907,282 filed Jul. 1, 1992, now abandoned.

BACKGROUND OF THE INVENTION

The present invention relates to a magnetic disk drive for recording and reproducing data from a magnetic recording medium and, more particularly, to a magnetic head assembly for recording and reproducing the data.

A magnetic disk drive causes a magnetic head to pivot relative to a magnetic disk or similar recording medium for recording or reproducing data in or out of the medium. Such a disk drive is extensively used with a computer, word processor or similar data processing apparatus as a storage device. To meet the increasing demand for high density recording, it is necessary to enhance the accuracy of the surface of the medium and to position the head relative to the medium accurately. Usually, the head is mounted on the free end of an elongate support or suspension arm which is driven by a voice coil motor to pivot in parallel with the surface of the medium. The head on the suspension arm is flexibly angularly moved by a movable leaf spring or gimbal spring connected to a flexible printed circuit which transmits an electric signal to the head. The problem with the conventional head assembly is the resonance of the suspension arm and gimbal spring which occurs in a certain frequency range on the frictional contact of the head with the medium. In light of this, it has been customary to apply solicone or similar vibration preventing material to around the fulcrum of the suspension arm where the head is supported. This, however, increases the number of production steps as well as the cost.

SUMMARY OF THE INVENTION

It is therefore an object of the present invention to provide a magnetic head assembly incorporated in a magnetic disk drive and capable of suppressing the resonance of the suspension arm and gimbal spring effectively.

It is another object of the present invention to provide a magnetic head assembly for a magnetic disk drive assembly which reduces the number of production steps and cost.

A magnetic head assembly supported by the free end of a suspension arm for recording and reproducing data from a magnetic recording medium of the present invention comprises a magnetic head for recording and reproducing data from the recording medium, a movable leaf spring member for allowing the magnetic head to behave flexibly, a flexible printed circuit for transmitting an electric signal to the magnetic head, and a control section provided on the end portion of the flexible printed circuit for controlling the behavior of the movable leaf spring member.

BRIEF DESCRIPTION OF THE DRAWINGS

The above and other objects, features and advantages of the present invention will become more apparent from the following detailed description taken with the accompanying drawings in which:

FIGS. 2A–2C show a conventional magnetic head assembly together with parts and elements associated therewith in a plan view, side elevation, and bottom view, respectively;

FIG. 3 is a plan view showing a flexible printed circuit included in the conventional assembly;

FIGS. 4A–4C are respectively a plan view, side elevation and bottom view showing a magnetic head assembly embodying the present invention together with the neighborhood thereof;

FIG. 5 is an exploded perspective view of the embodiment;

DESCRIPTION OF THE PREFERRED EMBODIMENTS

Figure 1:
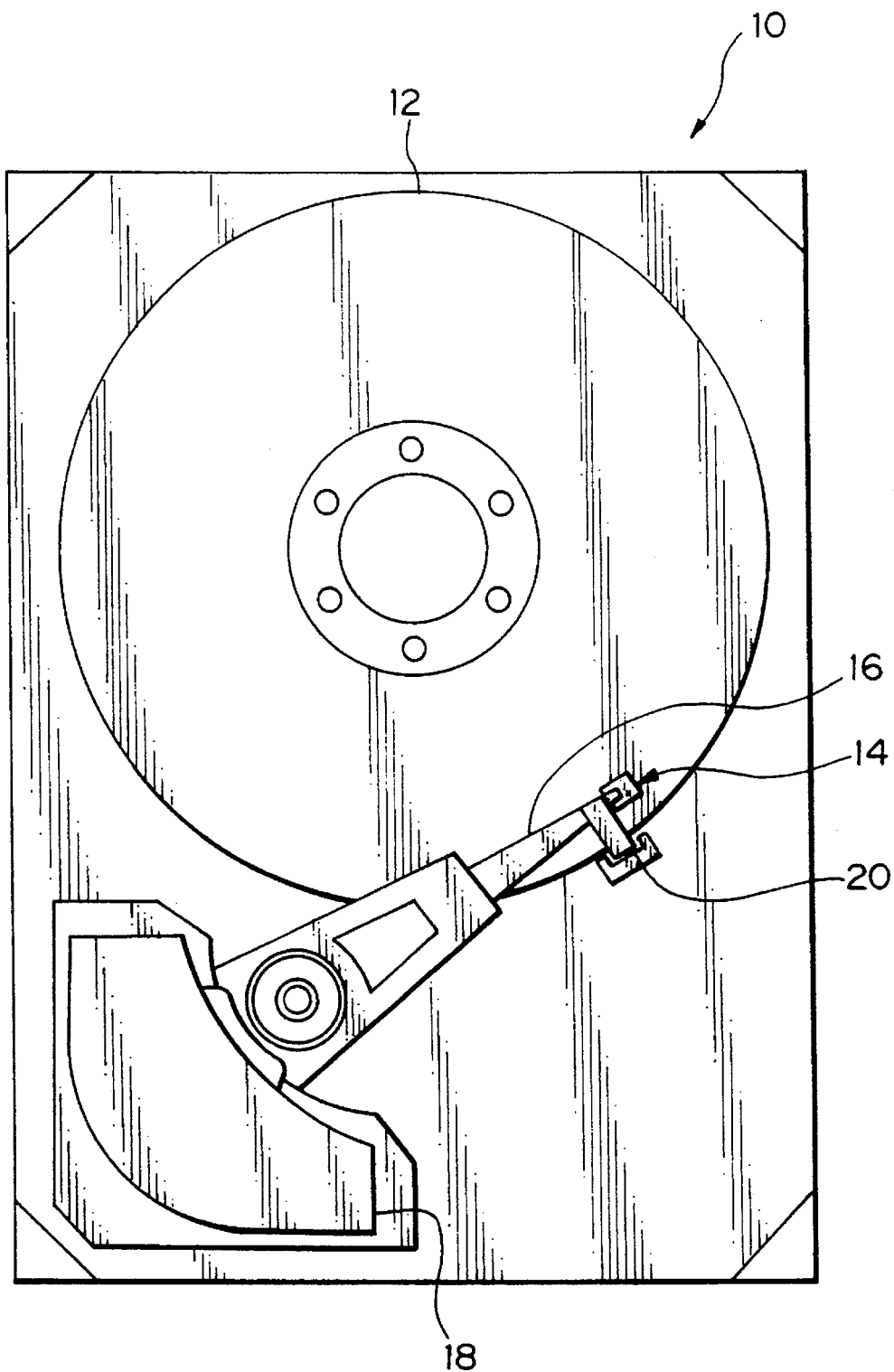
FIG. 1 is a plan view of a magnetic disk drive to which the present invention is applicable.

Referring to FIG. 1, a magnetic disk drive to which the present invention is applicable is shown and generally designated by the reference numeral 10. As shown, the disk drive 10 has a magnetic head assembly 14 for recording and reproducing data from a magnetic disk or similar medium 12 which is in rotation. A suspension arm, or head support member, 16 supports the head 14 at the free end thereof and is caused to pivot by a voice coil motor 18 in parallel with the surface of the medium 12. When the suspension arm 16 is moved toward the outer edge of the medium 12, it abuts against and urges the side of a lifter 20.

The conventional magnetic head assembly 14 will be described specifically together with the arrangement surrounding it, i.e., the free end of the suspension arm 16. As shown in FIGS. 2A–2C, the head assembly 14 has a head 14a, a movable leaf spring or girohal spring 22 for allowing the head 14 to behave flexibly, and a flexible printed circuit (FPC) 24 for transmitting an electric signal to the head 14a. The FPC 24 carrying the head 14a therewith is shown in FIG. 3 specifically. The problem with the head assembly 14A is that the suspension arm 16 and girohal spring 22 resonate in a certain frequency range due to the frictional contact of the head 14a and medium 12. In the light of this, as shown in FIG. 2A, a vibration preventing member 26 made of silicone or similar material is affixed to the suspension arm 16 in the vicinity of a fulcrum 16a where the arm 16 supports the assembly 14A. Such an implementation, however, increases the number of production steps as well as the cost.

Preferred embodiments of the magnetic head assembly in accordance with the present invention will be described hereinafter. In the embodiments, the same or similar parts or elements to those of the conventional magnetic head assembly 14A are designated by like reference numerals, and redundant description will be avoided for simplicity.

Figure 6:
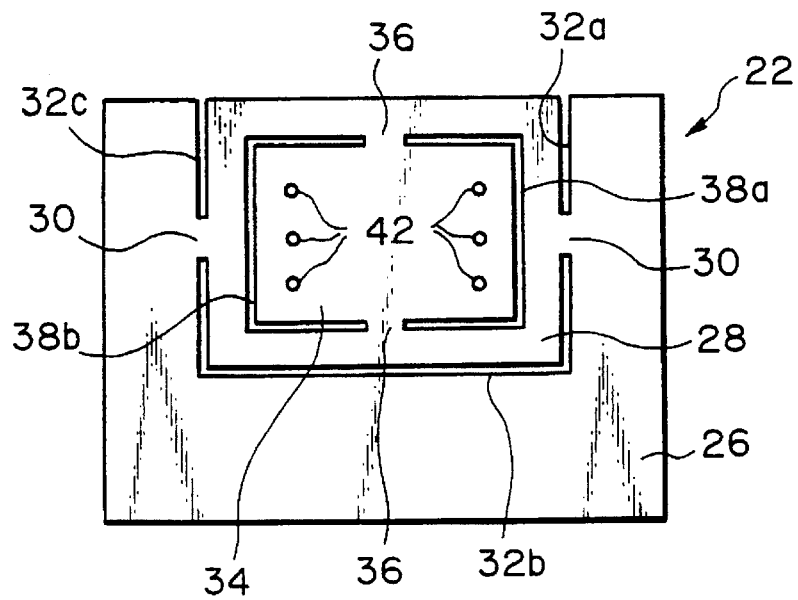
FIG. 6 is a plan view of a gimbal spring included in the embodiment.

A magnetic head assembly embodying the present invention is shown in FIGS. 4A–4C corresponding to FIGS. 2A–2C, respectively. As shown, the head assembly 14 has an FPC 24 which differs from the FPC 24 of the conventional assembly 14A. To better understand the difference, a reference will first be made to FIG. 5 for describing the general construction of the head assembly 14. As shown in FIG. 5, a gimbal spring 22 includes a generally U-shaped mounting portion 26 to be mounted on a suspension arm 16. A rectangular intermediate portion 28 is positioned inside of the mounting portion 26 and connected to the latter only by two bridges 30. More specifically, the intermediate portion 26 is physically separated from the mounting portion 26 by slits 32a, 32b and 32c except for the bridges 30. A head support portion 34 is positioned inside of the intermediate portion 28 and connected to the latter by only two bridges 36, i.e., separated from the latter by discontinous slits 38a and 38b. The bridges 30 and 36 are positioned such that an imaginary line connecting the bridges 30 and an imaginary line connecting the bridges 36 extend perpendicular to each other and intersect each other at the center of the head support portion 34. The girohal spring 22 having such a configuration is shown in a plan view in FIG. 6. The intermediate portion 28 and head support portion 34 are angularly movable together relative to the mounting portion 26 about the line connecting the bridges 30. The head support portion 34 is angularly movable relative to the intermediate portion 28 about the line connecting the bridges 36. Therefore, the head support portion 34 is movable in any direction relative to the mounting portion 26.

A suspension arm 16 has stepped portions 16a, 16b and 16c to which the mounting portion 26 of the girohal spring 22 is affixed by adhesive. A magnetic head 14a is affixed to the head support portion 34 of the girohal spring 22 by adhesive. The head 14a has a flat surface for adhesion on the underside thereof, and six terminals 40 extending out from the flat surface. Six holes 42 are formed throughout the girohal spring 22 for receiving the six terminals 40 of the head 14a. The head support portion 34 of the gimbals spring 22 has a region 44 where the underside of the head 14a is connected by adhesive.

Figure 7:
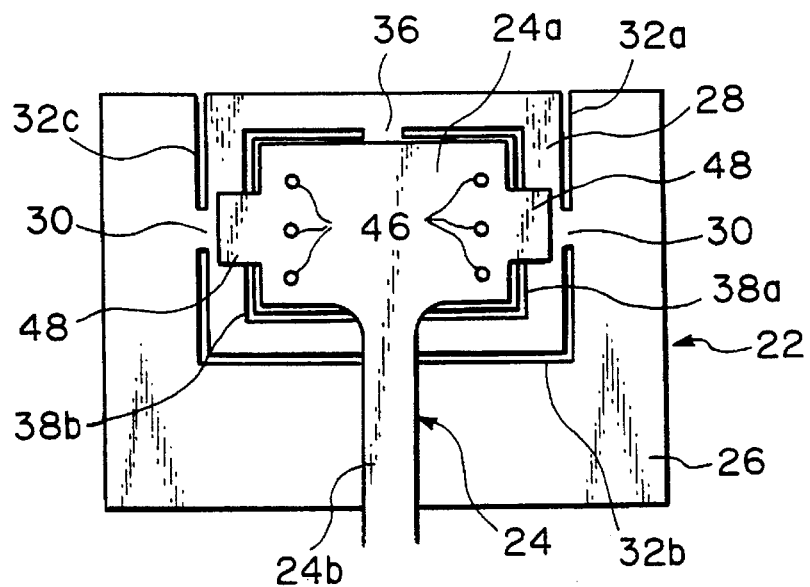
FIG. 7 is a plan view showing the gimbal spring and a flexible printed circuit of the embodiment in an assembled condition.

The FPC 24 is made of polyimide and fitted on the underside of the gimbal spring 22. The EPC 24 has a mounting portion 24a at one end and a cable portion 24b extending out from the mounting portion 24a. A plurality of leads are printed on the cable portion 24b to set up electrical connection of the head 14a and circuitry, not shown. Six holes 46 are formed throughout the FPC 24 in alignment with the holes 42 of the gimbal spring 22. The FPC 24 shown in FIG. 5 is representative of the embodiment of the invention and provided with a pair of lugs 48 in the mounting portion 24& thereof. As shown in FIG. 7, the FPC 24 is adhered to the gimbal spring 22 over substantially the entire area thereof, except for the regions surrounding the holes 46 and the cable portion 24b. Specifically, the FPC 24 is adhered to the gimbal spring 22 over an area indicated by hatching in FIG. 5. The FPC 24 has the 15 mounting portion 24 and the lugs 48 thereof adhered to the head support portion 34 and the intermediate portion 28, respectively. Specifically, the FPC 24 is adhered to the gimbal spring 24 at the underside thereof over an area indicated by hatching in FIG. 5. When the FPC 24 is so adhered to the gimbal spring 24, the lugs 48 adjoin the bridges 30.

In the illustrative embodiment, the head support portion 34 and intermediate portion 28 of the girohal spring 24 are connected together not only by the bridges 36 but also by the resin constituting the FPC 24 and located at positions 54 shown in FIG. 5. Since the head support portion 34 angularly moves about the line connecting the bridges 36 most intensely at the positions 54, the lugs 48 of the FPC 24 suppress such a movement of the head support portion 34 most effectively. More specifically, the lugs 48 are used to tie the head support portion 34 and intermediate portion 28 and exhibit a particular effect depending on the positions thereof.

Figure 8:
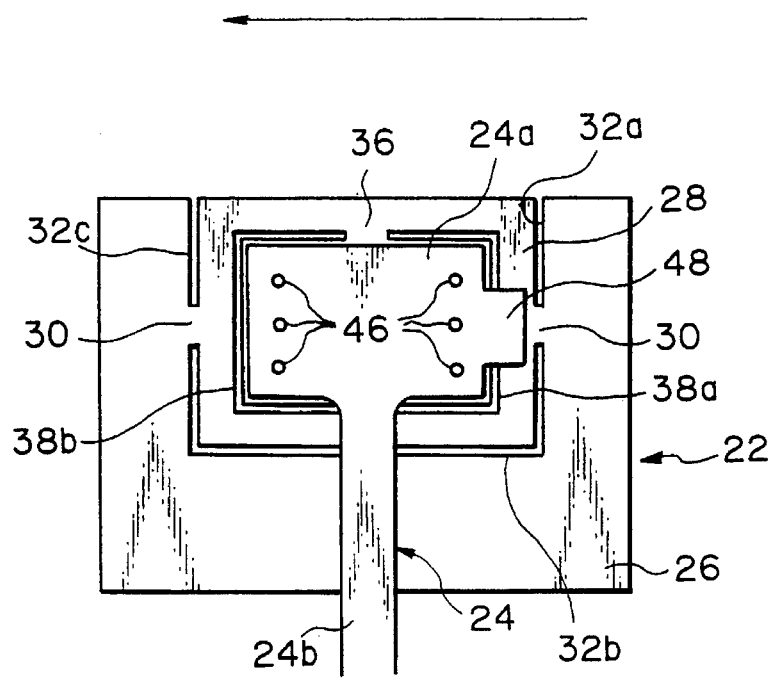
FIGS. 8 and 9 are plan views each showing a modified form of the flexible printed circuit of the embodiment.
Figure 9:
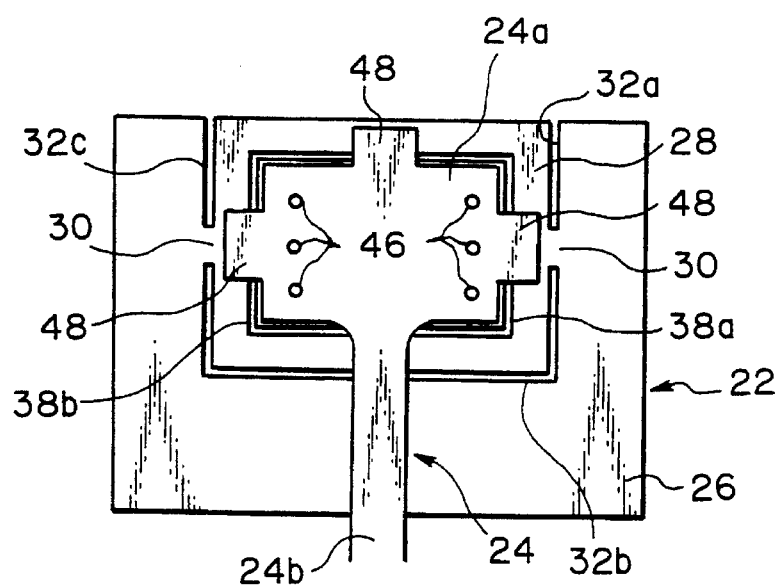

If desired, the FPC 24 may be provided with only one lug 48, as shown in FIG. 8. An arrow shown in FIG. 8 indicates a direction in which the medium 12 runs. Further, as shown in FIG. 9, the FPC 24 may be provided with three lugs 48. The FPC 24 with the three the lugs 48 is superior to the previous FPCs 24 in respect of the vibration preventing effect.

Figure 10:
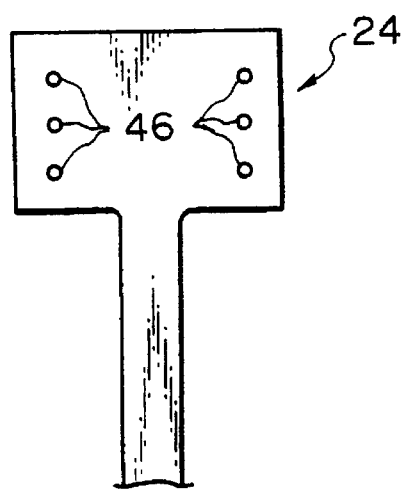
FIG. 10 is a plan view showing still another modified form of the flexible printed circuit of the embodiment.
Figure 11:
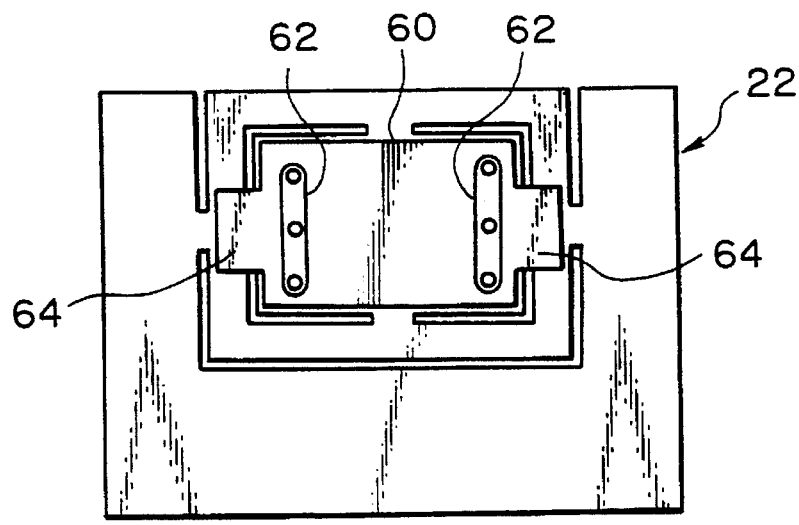
FIG. 11 is a plan view showing an adhesive sheet attached to the flexible printed circuit of FIG. 10.

An alternative embodiment of the present invention will be described hereinafter. This embodiment is characterized in that the FPC 24 is void of the lug or lugs 48, as shown in FIG. 10. In this particular embodiment, the FPC 24 is connected to the gimbal spring 22 by a two-sided adhesive sheet including lugs corresponding to the lugs 48, as will be described. As shown in FIG. 11, a two-sided adhesive sheet 60 is formed with elongate slots 62 facing the holes 42 of the gimbal spring 22, and a pair of lugs 64. Again, in FIG. 11, an arrow indicates a direction in which the medium 12 runs. The FPC 24 shown in FIG. 10 is adhered to the mounting portion 24a except for the lugs 64.

Figure 12:
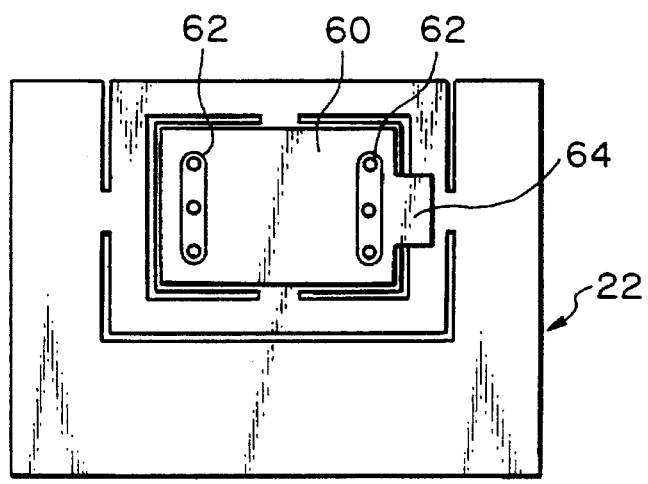
FIGS. 12 and 13 are plan views each showing a modified form of the adhesive sheet of FIG. 11.
Figure 13:
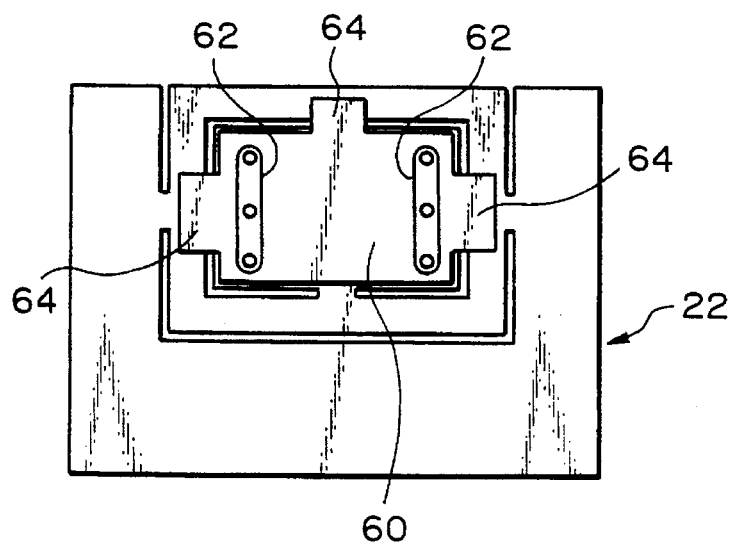

If desired, the two lugs 64 may be replaced with one lug 64 as shown in FIG. 12 or with three lugs 64 as shown in FIG. 13.

Figure 14A:
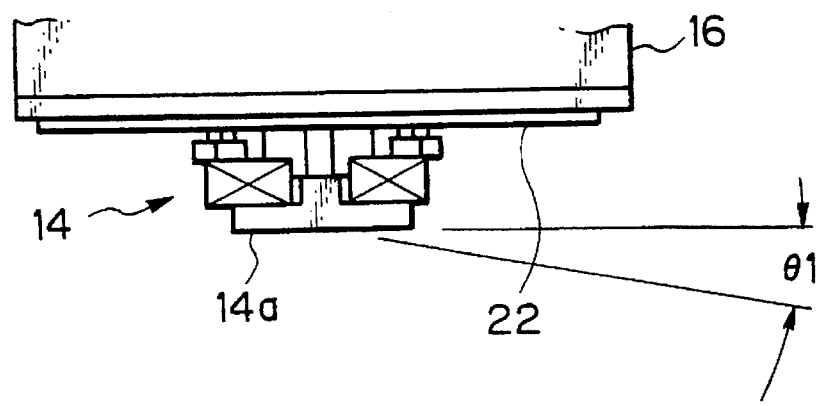
FIGS. 14A and 14B show the magnetic head assembly of the invention mounted on a suspension arm.
Figure 14B:
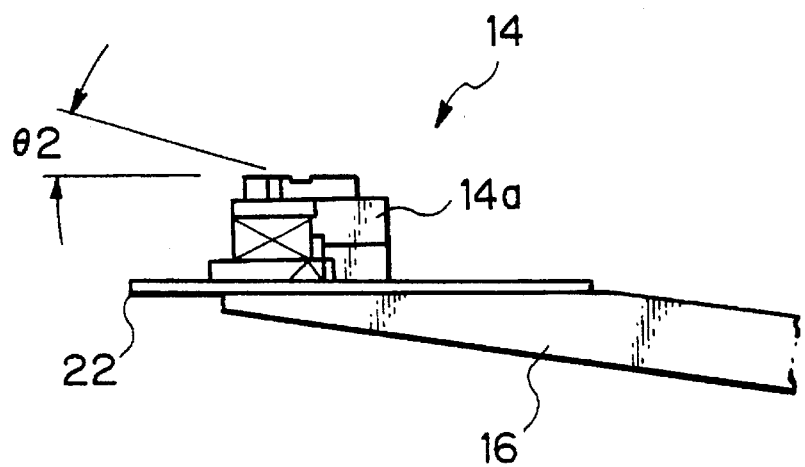

The magnetic head assembly 14 having any one of the configurations described above is mounted on the suspension arm 16, as shown in FIGS. 14A and 14B. The head 14a is affixed to the suspension arm 16 by the FPC 24 having the unique lug or lugs 48 or the two-sided adhesive sheet 60 having the lug or lugs 64. This is successful in reducing the deviation of the planeness of the head 14a, i.e., the deviation of the sliding surface of the head 14a in the direction of pitch angle Q1 and the direction of roll angle Q2. Hence, the head 14a is capable of contacting the medium 12 stably. Preferably, the pitch angle Q1 and roll angle Q2 should each be ±50 minutes in order to insure such stable contact.

It is noteworthy that the rigidity of the gimbal spring 22 can be freely changed by changing the size of each lug 48 of the FPC 24 or that of each lug 64 of the adhesive sheet 60.

In summary, it will be seen that the present invention provides a magnetic head assembly which reduces the resonance of a gimbal spring and a suspension arm ascribable to the frictional contact of a head and a recording medium. This unprecedented advantage is derived from a unique arrangement including a movable leaf spring member which allows the head to behave flexibly, and a flexible printed circuit with unique lugs. The flexible printed circuit controls the angular movement of the gimbal spring. The size of each lug is variable to provide the gimbal spring with any desired rigidity in the direction of pitch angle and the direction of roll angle. Furthermore, since the resonance of the gimbal spring and suspension arm is suppressed, it is not necessary to apply silicone or similar vibration preventing material to around the fulcrum of the suspension arm. This reduces the number of steps included in the production line.

Various modifications will become possible for those skilled in the art after receiving the teachings of the present disclosure without departing from the scope thereof. For example, the present invention may be applicable to a floppy disk drive.

What is claimed is:

1. A magnetic head assembly supported by a free end of a suspension arm for recording and reproducing data from a magnetic recording medium, said assembly comprising:

a magnetic head for recording and reproducing data from said recording medium;

a movable leaf spring member for allowing said magnetic head to behave flexibly, said movable leaf spring being a gimbal spring which comprises a mounting portion to be supported by the suspension arm, a head supporting portion for mounting said magnetic head, an intermediate portion disposed between said mounting portion and said head supporting portion, first bridge means connecting said mounting portion and said intermediate portion and supporting said intermediate portion angularly and movably and second bridge means connecting said intermediate portion and said head supporting portion and supporting said head supporting portion angularly and movably, wherein a plurality of first slits are formed between said intermediate portion and said mounting portion where said first bridge means is not located and a plurality of second slits are formed between said intermediate portion and said head supporting portion where said second bridge means is not located; and a flexible printed circuit secured to said head supporting portion for transmitting an electric signal to said magnetic head and comprising lug means formed thereon, said lug means extending from said head supporting portion toward said intermediate portion and contacting said head supporting portion for suppressing a movement of said head supporting portion.

2. An assembly as claimed in claim 1, wherein said lug means comprises a single lug.

3. An assembly as claimed in claim 1, wherein said lug means comprises a pair of lugs symmetrical to each other.

4. An assembly as claimed in claim 1, wherein said flexible printed circuit comprises a mounting portion forming said lug means on an end portion and a cable portion for transmitting the electric signal.

5. An assembly as claimed in claim 1, further comprising a two-sided adhesive sheet for adhering said gimbal spring and said flexible printed circuit.

6. An assembly as claimed in claim 5, wherein said lug means comprises a pair of lugs extending out from said two-sided adhesive sheet toward said intermediate portion.

7. An assembly as claimed in claim 1, wherein said first bridge means comprises a pair of first bridges connecting said mounting portion and said intermediate portion and said second bridge means comprises a pair of second bridges connecting said intermediate portion and said head support portion, an imaginary line connecting said first bridges and an imaginary line connecting said second bridges intersecting each other at right angles.

8. An assembly as claimed in claim 7, wherein said lug means comprises a pair of first lugs symmetrical to each other, said pair of first lugs each adjoining one of said first bridges of said gimbal spring.

9. An assembly as claimed in claim 8, wherein said lug means further comprises a single second lug adjoining one of said second bridges.

10. An assembly as claimed in claim 7, further comprising a two-sided adhesive sheet for adhering said gimbal spring and said flexible printed circuit.

11. An assembly as claimed in claim 10, wherein said lug means comprises a pair of lugs extending out from said two-sided adhesive sheet toward said intermediate portion said pair of lugs each adjoining one of said first bridges of said gimbal spring.

12. A magnetic head assembly supported by a free end of a suspension arm for recording and reproducing data from a magnetic recording medium, said assembly comprising:

a magnetic head for recording and reproducing data from said recording medium;

a movable leaf spring member for allowing said magnetic head to behave flexibly, said movable leaf spring being a gimbal spring which comprises a mounting portion to be supported by the suspension arm, a head supporting portion for mounting said magnetic head, an intermediate portion intervening between said mounting portion and said head supporting portion, and bridge means connecting said mounting portion and said head supporting portion and supporting said head supporting portion angularly and movably;

a flexible printed circuit for transmitting an electric signal to said magnetic head and comprising lug means formed thereon;

a two-sided adhesive sheet for adhering said gimbal spring and said flexible printed circuit;

wherein said lug means comprises a pair of lugs extending out from said two-sided adhesive sheet toward said intermediate portion, said pair of lugs being adhered to said intermediate portion for suppressing a movement of said head supporting portion; and control means for controlling behavior of said movable leaf spring member.

* * * * *

UNITED STATES PATENT AND TRADEMARK OFFICE
CERTIFICATE OF CORRECTION

PATENT NO. : 5,463,513
DATED : October 31, 1995
INVENTOR(S) : Yoshimasa HOSHINO

It is certified that error(s) appears in the above-identified patent and that said Letters Patent is hereby corrected as shown below:

Col. 2, line 44, delete "girohal", insert --gimbal--.

Col. 2, line 49, delete "girohal", insert --gimbal--.

Col. 3, line 18, delete "girohal", insert --gimbal--.

Col. 3, line 28, delete "girohal", insert --gimbal--.

Signed and Sealed this

Eleventh Day of June, 1996

Attest:

BRUCE LEHMAN

*Attesting Officer*  *Commissioner of Patents and Trademarks*